United States Patent
Barreto et al.

(10) Patent No.: US 7,951,858 B2
(45) Date of Patent: *May 31, 2011

(54) BITUMINOUS PRODUCTS AND AQUEOUS EMULSIONS BASED ON BITUMINOUS PRODUCTS AND USES THEREOF

(75) Inventors: Gilles Barreto, Messimy (FR); Lionel Grampre, Saint Foy les Lyon (FR)

(73) Assignee: CECA S,A,, Colombes (FR)

( * ) Notice: Subject to any disclaimer, the term of this patent is extended or adjusted under 35 U.S.C. 154(b) by 10 days.

This patent is subject to a terminal disclaimer.

(21) Appl. No.: 12/303,303

(22) PCT Filed: Jun. 6, 2007

(86) PCT No.: PCT/FR2007/051384
§ 371 (c)(1),
(2), (4) Date: Dec. 3, 2008

(87) PCT Pub. No.: WO2007/141458
PCT Pub. Date: Dec. 13, 2007

(65) Prior Publication Data
US 2009/0203815 A1    Aug. 13, 2009

Related U.S. Application Data

(60) Provisional application No. 60/858,568, filed on Nov. 13, 2006.

(30) Foreign Application Priority Data

Jun. 6, 2006    (FR) ...................................... 06 52035

(51) Int. Cl.
*C08L 95/00*    (2006.01)

(52) U.S. Cl. ................................ 524/68; 524/70; 524/71
(58) Field of Classification Search .................... 524/68, 524/70, 71
See application file for complete search history.

(56) References Cited

U.S. PATENT DOCUMENTS

| | | | |
|---|---|---|---|
| 4,371,400 A | 2/1983 | Muller et al. | |
| 4,793,933 A | 12/1988 | Rostoker et al. | |
| 5,743,950 A | 4/1998 | Hendriks et al. | |
| 5,820,663 A | 10/1998 | Miller et al. | |
| 6,024,788 A | 2/2000 | Tomioka et al. | |
| 6,261,356 B1 | 7/2001 | Isobe et al. | |
| 6,451,885 B1 | 9/2002 | Dresin et al. | |
| 6,588,974 B2 | 7/2003 | Hildebrand et al. | |
| 6,846,354 B2 | 1/2005 | Larsen et al. | |
| 7,732,511 B2* | 6/2010 | Barreto et al. | 524/68 |
| 2004/0033308 A1 | 2/2004 | Barthel et al. | |
| 2004/0168611 A1* | 9/2004 | Dresin et al. | 106/273.1 |
| 2005/0076810 A1 | 4/2005 | Barthel et al. | |
| 2008/0194738 A1* | 8/2008 | Crews et al. | 524/60 |
| 2009/0088499 A1* | 4/2009 | Barreto et al. | 524/68 |

FOREIGN PATENT DOCUMENTS

| | | |
|---|---|---|
| EP | 0425151 | 5/1991 |
| EP | 1323867 | 7/2003 |
| EP | 1469038 | 10/2004 |
| JP | 58117253 | 7/1983 |
| WO | WO2005/100480 | 10/2005 |

* cited by examiner

*Primary Examiner* — Peter Szekely
(74) *Attorney, Agent, or Firm* — Steven D. Boyd

(57) ABSTRACT

The invention concerns novel bituminous products, as well as novel aqueous emulsions of bituminous products, mixtures thereof with coated granules, useful for sealing application, building and maintaining road surfaces, sidewalks and runways, road surfaces, sidewalks, bicycle paths, parking lots and runways.

21 Claims, 2 Drawing Sheets

BITUMINOUS PRODUCTS AND AQUEOUS EMULSIONS BASED ON BITUMINOUS PRODUCTS AND USES THEREOF

FIELD OF THE INVENTION

The present invention relates to the field of sealing, construction and repair of road coverings, pavements and aircraft runways where mixes of aggregates and bituminous products are used.

Within the context of the present invention, the expression "bituminous products or binders" is understood to mean natural bitumen and bitumens derived from a mineral oil and the resulting mixes thereof. Bitumens obtained by cracking and tars are also considered here as bituminous products within the meaning of the present invention, and also the mixes which may result therefrom. Blown bitumens—residues of distillation, vacuum distillation or precipitation (for example obtained by propane precipitation)—are examples considered within the context of this invention. Also considered here are bitumens diluted using petroleum solvents, bitumens diluted using vegetable oils and polymer bitumens. The bituminous products listed above are anhydrous, as much as is possible on the industrial production scale in question.

In the present invention, the term "aggregates" is understood to mean divided mineral materials from quarries, bituminous mix aggregates, milled fragments, clinker or breeze, scoria and slags, and also concrete demolition recycling products.

In everything that follows, the mix of aggregates and bituminous products will also be referred to as a "bituminous mix".

Many processes for producing mixes of aggregates and bituminous products are currently used, which may be classified in three separate groups: production processes at ambient temperature, processes at a temperature above 100° C. and processes at intermediate temperatures between ambient temperature and 100° C., that is to say for which it is necessary to supply thermal energy for the production of the bituminous mix, while allowing the presence of liquid water in the bituminous mix.

The processes for producing bituminous mixes at ambient temperature are those for which the production of the mix of bituminous binder and aggregates is carried out without a supply of thermal energy. Mention may be made of the coating of aggregates using a bitumen to which a volatile solvent has been added so as to make it sufficiently fluid at ambient temperature in order to allow good coating of the aggregates. The bituminous mix is subsequently used by means of suitable equipment for transporting, laying and compacting it. This technique is tending to disappear as it consumes solvents in large quantities, solvents which, by evaporating into the atmosphere, create pollution that can be avoided by other techniques.

Mention may also be made of the production techniques using, as a bitumen carrier, bitumen emulsions or dispersions in an aqueous solvent. The bitumen emulsion or dispersion is mixed with the aggregates so to ensure that it is properly coated. The mix obtained is then used by means of suitable equipment for transporting, laying and possibly compacting it. These techniques have the advantage of concentrating the phase where high temperatures are involved in a plant where the emulsion is manufactured. The aggregate used at ambient temperature may contain water. These techniques therefore do not require heat treatment of the aggregates, which limits the consumption of energy during the production of the bituminous mix and the production of dust. Furthermore, since the mix is at ambient temperature, that is to say between around 5° C. and 30° C., the emissions of volatile organic compounds are very low. However, the mechanical performance obtained with these mixes is, in general, inferior to that obtained with other techniques described below, especially at a young age. This technique has found its niche in road repair for roadways subjected to light or moderate traffic, for example secondary roads, parking areas of individual or public housing, or of buildings, cycle paths, etc.

This technique applies, in particular, to cold-poured mixes for which the application problem is solved in most cases if the rules of the art are followed, since the mix is applied in the form of a "soup" a few seconds after it has been manufactured. On the other hand, the necessary step of increasing the cohesion is encountered, this step generally being performed without an external stress, by chemical and physical change in the system, although in some cases a compacting operation is carried out. This change involves the coalescence of the bitumen of the emulsion, coalescence that greatly depends on the quality of the bitumen and that may lead to insufficient cohesion at a young age, despite operating the production equipment according to the rules of the art. For this reason a person skilled in the art, when he has a choice, prefers to choose a bitumen belonging to the class of naphthenic bitumens. These bitumens are differentiated from other bitumens by a chemical composition that contains naphthenic molecules in a very significant quantity. However, naphthenic bitumens have the drawback of being produced in a lesser quantity than other bitumens, or even of not being for sale in some geographical regions. When naphthenic bitumen is not available, obtaining good quality cold-poured mixes requires an improved monitoring of the weather to avoid rain just after the work and also requires closing to traffic for longer periods after the work has finished. There is an unfulfilled need to improve the performance of cold-poured mixes using bitumens other than naphthenic bitumens.

Processes at a temperature above 100° C. use the bitumen in anhydrous form, in a sufficiently fluid state to ensure that the aggregates are properly coated. So as to ensure good coating and good final mechanical properties, it is conventional to dry the aggregates and to bring them to a temperature close to that of the bitumen. There are two main types of processes: continuous processes and batch processes.

In a continuous process, the aggregates are fed continuously into a drum that has a burner for heating the aggregates by flame radiation. In a zone of the drum not exposed to the radiation, the aggregates coming from the drying zone are coated with liquid bitumen before exiting and being conveyed to a buffer storage hopper.

In a batch process, a mixer maintained at high temperature is used, into which various grades of the aggregates are poured in batches. These are homogenized by mixing and then the bitumen is added by pouring it in. After mixing, the mix of aggregates and bituminous product obtained may be stored in a hopper. The mix obtained is then used by means of suitable equipment allowing it to be transported, spread and optionally compacted. The mix obtained is transported and deposited at a high enough temperature to ensure proper spreading, proper smoothing and optionally proper compacting. The choice of process temperatures depends on the class of bitumen and is generally controlled. For bituminous concretes and bitumen-bound gravels in France for example, the temperatures of the mixes of aggregates and bituminous products on leaving a plant, with a pure bitumen having a penetration index of 35/50, are generally from 150 to 170° C., or even from 160 to 180° C. when the weather conditions are harsher; for spreading, the temperature of the mixes of aggregates and bituminous products is above 130° C. French standard NF P 98-150 from December 1992 constitutes the reference standard for implementing roadway structures, binder courses and wearing courses made of hydrocarbon-based bituminous mixes, French standard NF P 98-130 from November 1999 constitutes the reference standard for semi-coarse bituminous concretes and French standard NF P 98-138 from November 1999 constitutes the reference standard for bitumen-bound gravels. These standards impose a temperature on leaving the plant of 150 to 170° C. and a minimum spreading temperature of 130° C. for a pure 35/50 penetration index bitumen. There is no constraint on the compacting temperature, but this is carried out immediately after spreading the mix so as to have a start-of-compacting temperature as close as possible to the temperature at which the mix was spread. Keeping the bitumen in a sufficiently liquid and therefore sufficiently hot state allows the bituminous mix to retain sufficient fluidity for these operations to be carried out correctly.

These two hot-mix processes, which use continuous or batch plants, are the ones most often employed when considering the tonnage of bitumen consumed worldwide, whether for road construction, road repair or in the field of sealing. They form the reference processes in the current state of the art. They are in fact the two most robust processes on an industrial scale. As with all the techniques presented here, it is necessary to have precise control over the grade of the aggregates, the quality of the bitumen, which must meet the country-specified standards, and the quality of the process, which is represented inter alia by the quality of the mixing determined by the geometry of the mixing zone, by the mixing energy, by the speeds of the moving parts and also by the various durations of the process. Few specific parameters have to be also checked in order to ensure correct execution of the operations and it is found that the behavior of the bituminous mix remains quite stable in the presence of fluctuations. The simple additional check of the temperature of the aggregates and of the bitumen during production and of the bituminous mix during spreading makes it possible to ensure that the operations are correctly executed. If we wish to make a comparison, the ambient-temperature techniques described above require the additional control of parameters such as the pH, the water content, the additive content and the chemical nature of the additives, the position for addition of these additives, the chemical nature of the aggregate and sometimes its age.

However, the two processes for manufacturing bituminous mixes at a temperature above 100° C. described above are not without defects:

- all bitumens do not give the same properties to the bituminous mixes produced: the two main classes of naphthenic bitumen and non-naphthenic bitumen are distinguished, with naphthenic bitumen having an advantage. The latter gives, at temperatures of aggregates and bitumen that are identical or close, a better fluidity to the mix with the aggregates. In practice, this is also expressed by a better compactability and a better cohesion. It is also observed that it is possible to lower the temperature of the mix of aggregates and of naphthenic bitumen by 5 to 15° C. relative to the case where non-naphthenic bitumen is used, while retaining an identical fluidity to the mix of non-naphthenic bitumen and aggregates. Here too, there is an unfulfilled need to improve the performance of mixes of non-naphthenic bitumen and aggregates;
- the heating and drying of the aggregates result in a substantial consumption of fossil, and therefore non-renewable, fuel. When the process is analyzed from the thermal standpoint, it is realized that only the bitumen is initially hot upon entering the mixing plant; the aggregates, which generally constitute 90 to 96% of the mass of the bituminous mix, are at ambient temperature. The step of temporarily heating the aggregates is carried out in order to ensure that there is a high-quality bitumen coating and also to ensure proper implementation. However, the product installed acquires beneficial properties only once it has cooled. All the energy expended is finally released into the atmosphere;
- concomitantly, large quantities of greenhouse gas (GHG) and dust are generated, said dust being partially collected and reinjected into the coating circuit. The implementation itself results in the emission of volatile organic compounds on the spreading site, which have an action on the greenhouse effect. It is possible to attach capture devices to the finisher, but this requires current workshops to be reequipped, and it does not eliminate the emissions emanating from the covering blade downstream of the finisher, and increases the price of the final product;
- the working conditions are difficult because of the thermal radiation and the gas emissions; and
- when, for uncontrollable reasons, such as deterioration in the weather conditions, the arrival of nightfall, a longer transport time from the plant to the site for example, the temperature of the premanufactured bituminous mix drops below a certain limit, the mix can no longer be correctly applied, resulting in porosity and mechanical performance drawbacks. The robustness of the process is limited. To offset this effect, it is common practice to produce the bituminous mix at temperatures above those recommended in the official documents. This amounts to exacerbating the first three drawbacks mentioned.

To reduce the extent of the last four drawbacks mentioned above, it is possible to envisage reducing the temperature of manufacture of the bituminous mix, thus reducing the fuel consumption necessary for heating the components of the mix, the production of greenhouse gases and the difficulty caused during use of the bituminous mix, while trying to modify the process for manufacturing the bituminous mix as little as possible relative to the processes at a temperature above 100° C., and this being, in particular, for the purpose of minimizing the costs.

PRIOR ART

Patent Application EP 425 151 claims mixes of bitumen and polymers, in particular ethylene oxide/propylene oxide copolymers, in proportions preferably between 1 and 20 parts per 100 parts of bitumen. The objective, which is clearly to limit the fluidity or the brittleness of the bituminous mixes, can not be achieved when the proportion of ethylene oxide/propylene oxide copolymer is less than or equal to 1 part per 100 parts of bitumen. In the examples, the addition of the copolymer at 10% leads either to an increase in the rutting resistance at 45° C. and no change in the low temperature brittleness, or no change in the rutting resistance at 45° C. and a reduction in the low temperature brittleness of the bitumen mix to which aggregates have thus been added compared to the case without addition to the bitumen. The reduction in rutting corresponds to a reduction in creep, that is to say a reduction in the deformation under strain. This therefore corresponds to a reduction in the fluidity of the bituminous mix at 45° C. compared to the pure bitumen mix at the same temperature.

U.S. Pat. No. 5,820,663 claims a composition containing bitumen and an adhesion dope which is the phosphoric ester of a monohydric fatty alcohol surfactant having an HLB between 8 and 18.

U.S. Pat. No. 6,261,356 claims the mix of bitumen, an oxypropylated and/or oxyethylated and phosphated $C_8$-$C_{22}$ fatty alcohol and at least one component chosen from mineral oils, $C_8$-$C_{18}$ fatty alcohols, $C_8$-$C_{18}$ fatty acids and $C_8$-$C_{18}$ fatty acid triglycerides. This composition has an improved adhesion to the aggregates. The inventors believe that the last component of the mix facilitates the orientation of the phosphated product at the bitumen-aggregate interface.

Solutions have been proposed in the literature for reducing the last four drawbacks cited above for the coating processes at a temperature above 100° C.

Some of these solutions relate to processes for which the production temperatures remain above 100° C., but technical solutions are found which consist in reducing the temperature for manufacturing the bituminous mix below 100° C.

In U.S. Pat. No. 6,588,974, paraffin waxes are added to the bitumen so as to obtain an acceptable bitumen viscosity for coating at a lower temperature, the temperature reduction being around 30° C. The paraffin waxes used act as a plasticizer for the bitumen. At a constant temperature, this helps to improve the compacting operation. At the same time, the waxes improve certain mechanical properties of the mix of aggregates and bituminous product, such as the rutting resistance. However, the addition of paraffin waxes changes the class of bitumen and may result in the standardized threshold of paraffin wax content for bitumens being exceeded. Concomitantly, there is a high risk of degrading the behavior of the bituminous mix when cold, by increasing its brittleness, that is to say by lowering the fracture energy upon frustrated shrinkage and by increasing the fracture temperature. Furthermore, if the compacting temperature is below the temperature of crystallization of the paraffin waxes in the bitumen, the compacting is much less effective.

U.S. Pat. No. 4,371,400 describes the use of a zeolite for improving the hot flow of a bituminous mix with a very low void content, while improving the indentation resistance at 22° C. and 40° C.

Applications US 2004/0033308 and US 2005/0076810 describe the use of zeolite, in particular zeolite A, in the production of a hot mix, which makes it possible to reduce the temperatures by at least 30° C. while maintaining normal behavior downstream of the in-plant mixing step. However, this process is not without drawbacks: such a process requires the presence of a storage silo and a zeolite additive system. Furthermore, the use of zeolite at a dose of at least 0.2% relative to the aggregates as recommended in these two patent applications represents a not inconsiderable additional cost.

WO 2005/100480 describes the combined use of zeolite and waxes in the production of low-temperature poured asphalts. The process described has not only the disadvantage of requiring storage, handling and a cost premium due to the zeolite but also that additionally due to the use of waxes.

WO 97/20890 describes a process for manufacturing bituminous mixes in which the mixing is carried out in two steps. Firstly, the aggregates are coated with a very soft anhydrous bitumen, the temperature of the mix obtained being between 80 and 115° C. Secondly, hard bitumen powder is added at a temperature below 50° C. Apart from the necessary modifications to be made to the existing industrial installations in order to be able to handle and add the bitumen powder, this process has the drawback of requiring time for a good cohesion to be obtained.

In EP 1 263 885 B1, aggregates at 130° C. are firstly coated with a soft anhydrous binder at 120° C. and then, in the form of foam, hard bitumen and steam are added to the mixer. The bituminous mix obtained is then used between 70 and 100° C. This process also requires time for a good cohesion to be obtained. Furthermore, the residual penetration obtained after mixing the two bitumens makes this process unsuitable for temperate or hot countries.

In EP 1 469 038 A1, the temperatures of the various grades injected into the mixer may be different: coarse aggregates are firstly coated with all the bitumen at a temperature above 130° C., then unheated wet sand is injected into the mixing plant, which has the advantage of limiting the energy consumption. During vaporization of the water, the fine aggregate elements are coated and water remains within the bituminous mix. The bituminous mix leaves the mixing plant at a temperature of between 60 and 100° C. A proposed variant consists in heating the coarse aggregates to 200° C. and then coating them with all of the bitumen and injecting the unheated wet sand. In this case, the water is completely removed and the coating of the sand takes place by vaporization of the water. In the first variant, the aim is to control the coating of the sand by vaporization of its water initially in the liquid state, which has the drawback of being a phenomenon that is highly dependent on the water content. Furthermore, the fluidity of the bituminous mix thus produced is not as good as that of a reference hot mix. In the second variant, the sand is not heated, but it is dried in the mixing plant, by heat transfer from the preheated coarse aggregates. At a constant bituminous mix temperature on leaving the plant, the amount of heat necessary to obtain an anhydrous bituminous mix according to that patent application is therefore very close to that needed to obtain a reference bituminous mix.

In EP 1 323 867, the coating of cold aggregates with hot bitumen is facilitated by pretreating the aggregates with an aqueous emulsion of flux and adhesion dope, and by fluxing the bitumen. The use of flux poses the problem of the rate of increase in cohesion which is slower than that obtained by cooling in the context of a manufacture according to the reference processes.

It is thus observed that the solutions proposed above for limiting the manufacturing temperature in the hot manufacturing processes have at least one of the following drawbacks to being able to operate effectively:

the need to greatly adapt and modify the industrial production unit; and/or the loss of certain end properties of the bituminous mix such as robustness, fluidity, cohesion and increase of brittleness at low temperature.

Solutions have also been proposed for reducing the failings of cold-poured bituminous mixes obtained from emulsions of non-naphthenic bitumen such as, for example, the acidification of bitumen using fatty carboxylic acids containing carbon-based chains having at least 8 carbon atoms. However, for these solutions, although improving the increase in cohesion at a young age of the cold-poured mix using a doped non-naphthenic bitumen emulsion relative to the cold-poured mix using an untreated non-naphthenic bitumen emulsion, the increase in cohesion is still insufficient relative to that obtained with the same cold-poured mix obtained with a naphthenic bitumen emulsion.

DETAILED DESCRIPTION OF THE INVENTION

Figure 1:
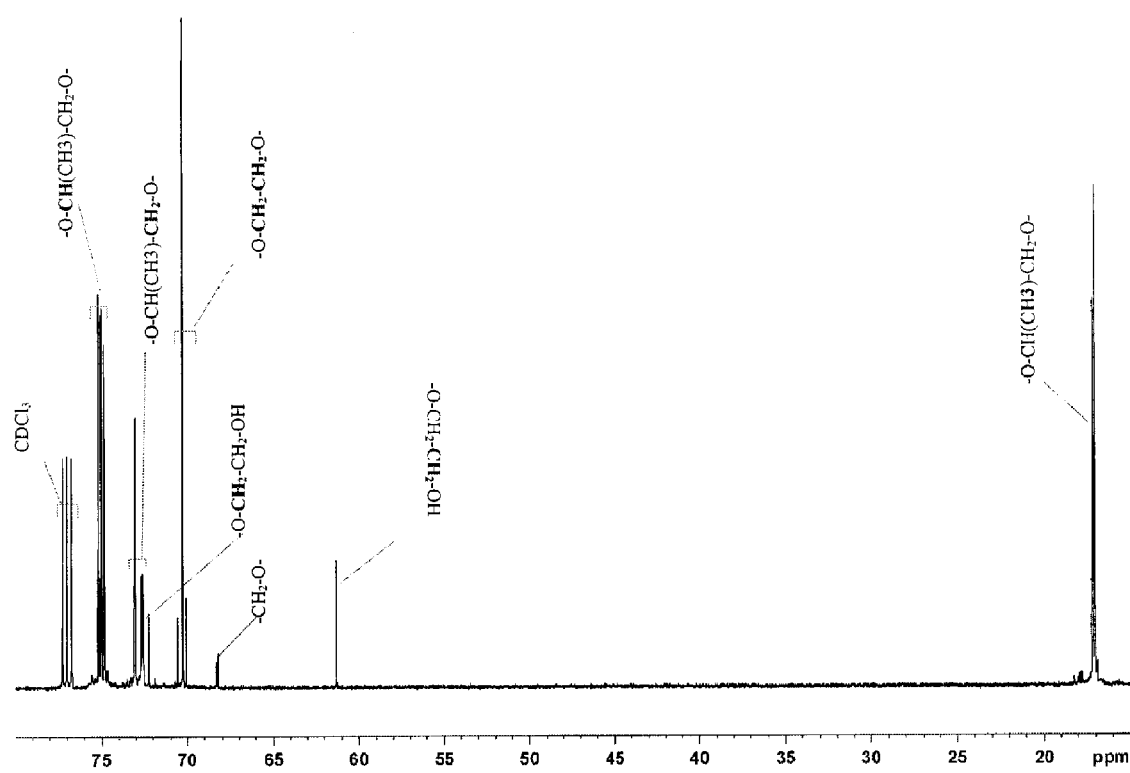
FIG. 1 is a $^{13}$C NMR spectrum of additive 5 in solution in deuterated methanol, with the chemical shift on the x-axis.

The present invention provides (anhydrous) bituminous products and mixes of these bituminous products with aggregates that can especially be used in the field of sealing, construction and repair of road coverings, pavements and aircraft runways.

The bituminous products according to the invention are characterized in that they contain at least one additive A to D from the following list:

additive A: comprising at least one random or block ethylene oxide/propylene oxide copolymer having a molecular weight between 500 g/mol and 20 000 g/mol, with a weight ratio of ethylene oxide to (ethylene oxide+propylene oxide) between 1% and 70%, of empirical chemical formula for the random copolymer: HO—$(CH_2CH_2O)_g$—$(CH_2CH(CH_3)O)_h$, the weight ratio of ethylene oxide to (ethylene oxide+propylene oxide) 44g/(44g+58h) being between 0.01 and 0.7, the sum 44g+58h+18 that represents the molecular weight of the copolymer being between 500 and 20 000, of chemical formula for the block copolymer: HO—$(CH_2CH_2O)_c$—$(CH_2CH(CH_3)O)_d$—$(CH_2CH_2O)_e$—H or HO—$(CH_2CH_2O)_{c+e}$—$(CH_2CH(CH_3)O)_d$—H, the weight ratio of ethylene oxide to (ethylene oxide+propylene oxide) 44(c+e)/(44(c+e)+58d) being between 0.01 and 0.7, the sum 44(c+e)+58d+18 that represents the molecular weight of the copolymer being between 500 and 20 000, of which the overall dose of additive(s) A per metric ton of bituminous product is between 0.1 and 9 kg, preferably 8 kg and advantageously 6 kg. Surprisingly, it is observed that the bituminous mixes containing one or more additives A exhibit an improvement in fluidity at constant temperature.

additive B: blend of at least one additive A as defined above and at least one product A1 of chemical formula: (R—O—$(CH_2CH(CH_3)O)_a$)—$(CH_2CH_2O)_b)_c$P(=O)—$OH_d$ where P is a phosphorus atom, c is between 1 and 2, c+d is equal to 3, a is up to 10, b is up to 6 and R represents a hydrocarbon-based chain having 6 to 30 carbon atoms, the dose of additive(s) A per metric ton of bituminous product being between 0.05 and 9 kg, preferably 8 kg and advantageously 6 kg, the overall dose of additive(s) A1 per metric ton of bituminous product preferably being between 0.05 and 10 kg and the respective proportions of the products A and A1 preferably being between 90/10 and 10/90. Surprisingly, it is observed that the bituminous mixes containing one or more additives B exhibit an improvement in fluidity at constant temperature.

additive C: blend of at least either one additive A or at least either one additive A1 or at least either one additive B as defined above and at least one product A2, the product A2 being chosen from one or more of the products A21 to A29 below:

the product A21, product of the reaction of (di)alk(en)ylphenols with aldehydes, the aldehydes having from 1 to 10 carbon atoms and more particularly from 1 to 5 carbon atoms, followed by a (poly)oxyethylation and/or (poly)oxypropylation, the alk(en)yl groups having between 1 and 50 carbon atoms and preferably between 2 and 20 carbon atoms and possibly being identical or different in the case of dialk(en)ylphenols, the part formed by (poly)oxyethylation and/or (poly)oxypropylation having a molecular weight greater than or equal to 45 g/mol and less than or equal to 20 000 g/mol, the number of phenol units of the product A varying between 3 and 50; the product A21 may be obtained in a known manner using an acidic or basic catalyst, and may be used directly or after neutralization of the catalyst.

the product A22, (poly)oxyethylated and/or (poly)oxypropylated 2,2-bis(4-hydroxyphenyl)propane/epichlorohydrin copolymer, the part formed by (poly)oxyethylation and/or (poly)oxypropylation having a molecular weight greater than or equal to 45 g/mol and less than or equal to 20 000 g/mol;

the product A23, (poly)oxyethylated and/or (poly)oxypropylated bis(4-hydroxyphenyl)ethane/epichlorohydrin copolymer, the part formed by (poly)oxyethylation and/or (poly)oxypropylation having a molecular weight greater than or equal to 45 g/mol and less than or equal to 20 000 g/mol;

the product A24, (poly)oxyethylated and/or (poly)oxypropylated bis(4-hydroxyphenyl)methane/epichlorohydrin copolymer, the part formed by (poly)oxyethylation and/or (poly)oxypropylation having a molecular weight greater than or equal to 45 g/mol and less than or equal to 20 000 g/mol;

the product A25, product of the (poly)oxyethylation and/or (poly)oxypropylation of an alkyldicarboxylic acid or mixture of alkyldicarboxylic acids, the alkyl groups having between 1 and 20 carbon atoms and preferably between 1 and 10 carbon atoms, all of the parts formed by (poly)oxyethylation and/or (poly)oxypropylation having a molecular weight greater than 100 g/mol and less than or equal to 20 000 g/mol;

the product A26, product of the (poly)oxyethylation and/or (poly)oxypropylation of a fatty acid, the number of carbon atoms of which is between 10 and 30, and more particularly the fatty acid of tall oil, the part formed by (poly)oxyethylation and/or (poly)oxypropylation having a molecular weight greater than 100 g/mol and less than or equal to 20 000 g/mol;

the product A27, product of the reaction between the product A21 and the mixture of products A25 and A26;

the product A28, salt of alk(en)yl(aryl)sulfonic acid and alk(en)yl(aryl)amine, the alk(en)yl(aryl) units having a number of carbon atoms between 6 and 30, and more particularly the salt of dodecylbenzenesulfonic acid and tallow amine, and also the salt of dodecylbenzenesulfonic acid and cyclohexylamine;

the product A29, salt of alk(en)yl(aryl)sulfonic acid and morpholine or pyrazine or pyrazoline or pyrazolone or pyridine or pyridone or pyrimidine or pyrrole or pyrrolidine or pyrrolidone or pyrroline or toluidine or imidazole or indole or indoline or oxindole, the alk(en)yl(aryl) units having a number of carbon atoms between 6 and 30, and more particularly the salt of dodecylbenzenesulfonic acid and morpholine.

The dose of product(s) A1 or B per metric ton of bituminous product is preferably between 0.05 and 10 kg, the dose of product(s) A per metric ton of bituminous product being between 0.05 and 9 kg, preferably 8 kg and advantageously 6 kg, and the dose of product(s) A2 per metric ton of bituminous product preferably being between 0.05 and 10 kg. Surprisingly, it is observed that there is a synergy between the product A or the product A1 or the product B and the product A2 in the proportions described above as regards the improvement in the fluidity of mixes of bituminous products and aggregates.

additive D: blend of at least either one product A or at least either one product B or at least either one product C as defined above and one or more adhesion dopes, the dose of product(s) A per metric ton of bituminous product being between 0.05 and 9 kg, preferably 8 kg and advantageously 6 kg, the dose of product(s) B or C per metric ton of bituminous product being between 0.1 and 10 kg, the dose of adhesion dope(s) per metric ton of bituminous product preferably being between 0.05 and 10 kg, the weight ratio of product(s) A, B or C to adhesion dope(s) preferably being between 90/10 and 10/90, and advantageously between 90/10 and 40/60. The term "adhesion dopes" is understood to mean products having an interfacial activity and added to the bituminous product in order to improve the quality of coating of the aggregate with the bituminous product and/or to improve the adhesion of the bituminous product to the aggregate and/or to improve the mechanical performance of the mix of bituminous product and aggregate. As non-limiting examples of adhesion dopes, mention may be made of alkylamidopolyamines, alkylimidazolines and alkylimidazopolyamines, products resulting from the reaction between polyamines and fatty carboxylic acids, and also fatty-chain alkylpolyamines, and also products resulting from the reaction between fatty carboxylic acids or vegetable oil and diethanolamine, followed by the reaction with polyamines, and also fatty carboxylic acids. As non-limiting examples, the polyamines may be dimethylaminopropylamine, N-aminoethylpiperazine, diethylenetriamine, triethylenetetramine and tetraethylenepentamine.

The present invention also relates to the process for preparing bituminous products to which at least one of the additives defined previously are added. The present invention proposes to add the additive A to D described above to the bituminous product at any moment during the logistic chain from the refinery to the site of the mix of aggregates and bituminous product.

For the preparation of bituminous products according to the invention to which an additive A to D composed of several components is added, it would not be outside the scope of the present invention to successively add the components of the additive with the bituminous product in order to carry out the final mixing, or to previously mix these components together before mixing them with the bituminous product.

Within the context of the present invention, the abovementioned additives may be used pure or diluted with carbon-based solvents such as petroleum solvents and/or vegetable oils when they are mixed with the bituminous products.

During the addition step, the temperature of the bituminous product is generally between 100 and 250° C., depending on the penetration class of the bituminous product and depending on its ring-and-ball softening temperature, and the temperature of the additive is in general between room temperature and 200° C., taking into account, for obvious safety reasons, the flash point of the additive. In the case where the additive is kept hot, it may advantageously be kept stirred in order to avoid hot spots and cold spots. The additive may be added in the solid state, either by a manual mechanical operation or by using a metering system suitable for solid products. The additive may also be added in the liquid state, either by being poured into a tank containing the bituminous product, in which case the contents must be recirculated in general for a time of at least 15 minutes before use, or by injection on a line transporting the bituminous product. The line transporting the bituminous product may be equipped downstream of the point of injection with a static mixer for improving the dispersion of the additive. In the case in which the additive according to the invention is added to a tank containing the bituminous product(s), the bituminous product with additives can be stored in the same way as the bituminous product(s) with no additives, without introducing any additional drawback in this step of the process.

The present invention also relates to the process for preparing bituminous mixes obtained by mixing bituminous products according to the invention with aggregates, and also to the road coverings prepared from these bituminous mixes. According to the invention, the mixing of aggregates and bituminous product is characterized in that it is carried out at temperatures of the granular fractions which may be different, making it possible to produce a bituminous mix at a temperature between 60 and 200° C., and preferably between 100 and 200° C. During the mixing, the temperature of the bituminous product is between 100 and 250° C. These temperatures depend, on the one hand, on the penetration class of the bituminous product—the lower the penetration, the hotter the bituminous product and the aggregates must be. These temperatures depend, on the other hand, on the ring-and-ball softening temperature of the bituminous product—the higher the softening temperature, the hotter the bituminous product and the aggregates must be. The additive may also be sprayed over the heated aggregate, before or during the addition of the bituminous product.

In the field of sealing, construction and repair of road coverings, pavements and aircraft runways, where mixes of anhydrous non-naphthenic bituminous products and aggregates are used, introducing additives into the non-naphthenic bituminous product, or into the mix thereof with aggregates, using at least one of the additives A to D defined above at doses, depending on the additive, of between 0.1 and 20 kg or 0.1 and 10 kg per metric ton of non-naphthenic bituminous product, makes it possible, surprisingly, to improve the fluidity of the bituminous mix at constant temperature relative to the bituminous mix containing non-additivated non-naphthenic bitumen, and to approach or even to attain the fluidity of the bituminous mix containing naphthenic bitumen at this same temperature. Thus the properties obtained downstream of the bituminous mix containing additivated non-naphthenic bitumen, such as the cohesion, are found to be positively impacted thereby.

Still in the field of sealing, construction and repair of road coverings, pavements, cycle paths, parking areas and aircraft runways, where mixes of anhydrous bituminous products and aggregates are used, introducing additives into the bituminous product, or into the mix thereof with aggregates, using the chemical additives described above at doses, depending on the additive, of between 0.1 and 20 kg or 0.1 and 10 kg per metric ton of bituminous product, makes it possible, surprisingly, to lower the temperature for production of mixes of aggregates and bituminous product by 20 to 40° C., to lower the temperature of the mix of aggregates and bituminous product during spreading by 10 to 40° C. and to lower the core temperature of the mix of aggregates and bituminous product during compacting, when this takes place, by possibly up to 50° C., without degrading the standardized properties of the bituminous product or of the mix of aggregates and bituminous product, while maintaining management of the process, from transportation to possible compacting, in accordance with the prior art, apart from the abovementioned considerations with regard to the temperatures. These temperature reductions are understood to mean with respect to the prior art reference. In France, the French standard NF P 98-150 of December 1992 constitutes the reference for implementing roadway structures, binder courses and wearing courses made of hydrocarbon-based bituminous mixes, French standard NF P 98-130 of November 1999 constitutes the reference for semi-coarse bituminous concretes and French standard NF P 98-138 of November 1999 constitutes the reference for bitumen-bound gravels. To give an example, for a 35/50 penetration index bitumen, these standards indicate that the acceptable limit temperatures are 150 to 170° C. for the coating operation and that the minimum temperature of the mix for spreading is 130° C.

The advantages of the invention over the prior art are listed below and in particular include the alleviation of the four abovementioned drawbacks when carrying out bituminous mix manufacturing processes at temperatures above 100° C.:

fossil fuel consumption is reduced;
dust and GHG emission is reduced;
the difficult working conditions during the spreading and compacting operations are reduced;
the operations of spreading and compacting the bituminous mix are less affected by the weather conditions;
the period of time that the mix can be used after it has been produced is extended;
when two strips of mix are deposited in succession side by side, the join separating them is stronger and better sealed;
thermal shrinkage is more limited, as is the risk of cracking; and
there is less oxidation of the bituminous product, thereby increasing the lifetime of the bituminous product/aggregates mix and making it easier for it to be recycled.

The present invention also provides cationic aqueous emulsions of bituminous products and also mixes of these cationic aqueous emulsions of bituminous products with aggregates that can especially be used in the field of repair of road coverings, pavements, cycle paths, parking areas and aircraft runways, characterized in that the bituminous products contain at least one additive from the following list:

additive A: as defined previously, of which the dose per metric ton of bituminous product present in the emulsion is preferably between 0.1 and 10 kg. It is surprising to observe an improvement in the increase in cohesion of the cold-poured bituminous mix obtained with an emulsion based on bitumen to which at least one additive A is added relative to the cold-poured bituminous mix obtained with an emulsion based on bitumen to which no additive is added.

additive D1: blend of at least one product A and one or more adhesion dopes such as defined previously, the dose of product(s) A per metric ton of bituminous product present in the emulsion preferably being between 0.1 and 10 kg, the dose of adhesion dope(s) per metric ton of bituminous product present in the emulsion being between 0.05 and 10 kg, the weight ratio of product(s) A to adhesion dope(s) preferably being between 95/5 and 10/90, and advantageously between 95/5 and 50/50.

The expression "cationic aqueous emulsions" is understood to mean emulsions having an aqueous continuous phase and for which the dispersed phase particles are positively charged and therefore cationic.

The cationic emulsions according to the invention (i.e. which contain at least one cationic emulsifier) may be prepared by bringing the additive A or D into contact with the bituminous product at a temperature within the temperature range stretching from 100 to 200° C., and preferably stretching from 120 to 180° C., prior to the emulsification. The emulsification is carried out by bringing the emulsifying aqueous phase into contact with the additivated bituminous product defined above, in an emulsification device operating continuously or in batch mode. The expression "emulsifying aqueous phase" is understood to mean the mixture of water, cationic emulsifier(s) and optionally organic or mineral acids.

Non-limiting examples of cationic emulsifiers that enable such emulsions to be obtained are alkylpolyamines, alkylamidopolyamines, alkylamido-imidazolines, quaternary alkylmonoamines, quaternary alkylpolyamines, amine derivatives of lignin obtained via direct amination or via the Mannich reaction or via the reaction between Kraft lignin and glycidylamine, and the mixtures that result therefrom.

The abovementioned additives may be used pure or diluted with carbon-based solvents such as petroleum solvents and/or vegetable oils during the preparation of the cationic aqueous emulsion according to the invention.

In the field of construction of road and pedestrian coverings with cold-poured bituminous mixes using cationic emulsions, introducing additives into the non-naphthenic bituminous product using chemical additives described above at doses, depending on the case, of between 0.1 and 20 kg or 0.1 and 10 kg per metric ton of bituminous product before it is put into emulsion, makes it possible to greatly increase the cohesion of the cold-poured bituminous mix. Introducing additives into the non-naphthenic bitumen does not modify the reactivity of the cationic emulsion and therefore does not necessitate modifying the formula of the emulsion in terms of the nature and amount of emulsifier and also in terms of the nature and amount of acid used.

EXAMPLES

In the following examples, additives were added to the 35/50 penetration index bitumen at 160° C., and to the 70/100 penetration index bitumen at 140° C., on a hot plate with stirring at 60 rpm for 15 minutes.

The penetration (or penetrability) and ring-and-ball softening point measurements on the bituminous mixes were in accordance with the NF EN 1426 and NF EN 1427 standards, respectively.

Example 1

The following additives were added to a 35/50 penetration index bitumen known as TOTAL Azalt, originating from the Feyzin refinery:

Additive 1 (type A): polymer from the class of ethylene oxide/propylene oxide block copolymers, with a molecular weight $M_w$ of around 4500 g/mol and a weight ratio of ethylene oxide to (ethylene oxide+propylene oxide) of around 40%, sold under the name Pluronic P94;

Additive 2 (type B): the blend, in 70/30 weight proportions, of the polymer from the class of ethylene oxide/propylene oxide block copolymers, with a molecular weight $M_w$ of around 3400 g/mol and a weight ratio of ethylene oxide to (ethylene oxide+propylene oxide) of around 20%, sold under the name Pluronic L92 and the product A1 of chemical formula (R—O—($CH_2$CH—($CH_3$)O)$_a$—($CH_2CH_2$O)$_b$)$_c$P(=O)—OH$_d$ where P is a phosphorus atom, c is between 1 and 2, c+d is equal to 3, a is equal to 0, b is equal to 4 and R represents a hydrocarbon-based chain having between 12 and 14 carbon atoms, the weight proportions of the product A1 of phosphate monoester and phosphate diester being respectively between 50 to 65% and 30 to 40%;

Additive 3 (type B): the blend, in 50/50 weight proportions, of the polymer from the class of ethylene oxide/propylene oxide block copolymers, with a molecular weight $M_w$ of around 3400 g/mol and a weight ratio of ethylene oxide to (ethylene oxide+propylene oxide) of around 20%, sold under the name Pluronic L92 and the product A1 of chemical formula (R—O—($CH_2CH$—($CH_3$)O)$_a$—($CH_2CH_2O$)$_b$)$_c$P(=O)—$OH_d$ where P is a phosphorus atom, c is between 1 and 2, c+d is equal to 3, a is equal to 0, b is equal to 4 and R represents a hydrocarbon-based chain having between 12 and 14 carbon atoms, the weight proportions of the product A1 of phosphate monoester and phosphate diester being respectively between 50 to 65% and 30 to 40%; and Additive 4 (type D): the blend, in 50/25/50 weight proportions, of the polymer from the class of ethylene oxide/propylene oxide diblock copolymers, with a molecular weight $M_w$ of around 4100 g/mol and a weight ratio of ethylene oxide to (ethylene oxide+propylene oxide) of around 3%, and respectively the result of the condensation of aminoethylpiperazine and a vegetable oil having fatty chains that contain from 14 to 18 carbon atoms, having an iodine value above 90, obtained by pouring the vegetable oil over aminoethylpiperazine at 150° C. for 2 h, then by heating the whole mixture at 190° C. for 1 h, and respectively an alkylamido-imidazoline obtained by the condensation reaction between carboxylic acid, having a fatty chain that contains from 14 to 22 carbon atoms and an iodine value above 100, and a mixture of 50% diethylenetriamine with 30% triethylenetriamine and 20% aminoethylpiperazine.

The penetrability and ring-and-ball softening point measurements are given in the following table:

| No. | Nature of the specimen | Penetration (×0.1 mm) at 25° C. | Penetration limits (×0.1 mm) | Softening point (° C.) | Softening point limits (° C.) |
|---|---|---|---|---|---|
| 1 | Pure bitumen | 38 | 35-50 | 54 | 50-58 |
| 2 | Bitumen + Additive 1 (5 kg/t) | 36 | | 53 | |
| 3 | Bitumen + Additive 2 (5 kg/t) | 36 | | 55 | |
| 4 | Bitumen + Additive 3 (5 kg/t) | 40 | | 55 | |
| 5 | Bitumen + Additive 4 (3 kg/t) | 39 | | 54 | |

Example 2

The following additives were added to a TOTAL Aqualt 70/100 penetration index bitumen, originating from the Donges refinery:

Additive 5 (type A): the polymer from the class of ethylene oxide/propylene oxide block copolymers, with a molecular weight $M_w$ of around 3400 g/mol and a weight ratio of ethylene oxide to (ethylene oxide+propylene oxide) of around 20%, sold under the name Pluronic L92;

Additive 6 (type D1): the blend, in 80/20 weight proportions, of the polymer from the class of ethylene oxide/propylene oxide block copolymers, with a molecular weight $M_w$ of around 3400 g/mol and a weight ratio of ethylene oxide to (ethylene oxide+propylene oxide) of around 20%, sold under the name Pluronic L92, and the result of the condensation of aminoethyl-piperazine and a vegetable oil having fatty chains that contain from 14 to 18 carbon atoms, having an iodine value above 90, obtained by pouring the vegetable oil over aminoethylpiperazine at 150° C. for 2 h, then by heating the whole mixture at 190° C. for 1 h; and Additive 7 (type A): the polymer from the class of ethylene oxide/propylene oxide block copolymers, with a molecular weight $M_w$ of around 2200 g/mol and a weight ratio of ethylene oxide to (ethylene oxide+propylene oxide) of around 20%, sold under the name Pluronic L62.

The penetrability and ring-and-ball softening point measurements are given in the following table:

| Nature of the specimen | Penetration (×0.1 mm) at 25° C. | Penetration limits (×0.1 mm) | Softening point (° C.) | Softening point limits (° C.) |
|---|---|---|---|---|
| Pure bitumen | 76 | 70-100 | 51.5 | 43-51 |
| Bitumen + Additive 5 (5 kg/t) | 76 | | 51.5 | |
| Bitumen + Additive 6 (5 kg/t) | 74 | | 51 | |
| Bitumen + Additive 7 (3 kg/t) | 77 | | 51.5 | |

Example 3

In a fixed plant possessing a drier/mixer drum, a 0/10 BBSG (a semi-coarse bituminous concrete) of Class 3 was manufactured in four different grades, all four having the following granular formula:

| calcareous filler | limestone | 5% |
|---|---|---|
| 0/2 sand | rhyolite | 34% |
| 2/6 aggregates | rhyolite | 12% |
| 6/10 aggregates | rhyolite | 49%. |

The bitumen used was a 35/50 Azalt from TOTAL with the following characteristics: penetration index at 25° C. equal to 40; 1.032 density; 51° C. ring-and-ball softening point. The content of bituminous product was 6.1 g per 100 g of aggregates. For the first two grades, the bitumen was used pure. For the third grade, the following additive was added to the bitumen, with a dose of 5 kg per metric ton of bitumen:

Additive 8 (type B): the blend, in 70/20/10 weight proportions respectively, of the polymer from the class of ethylene oxide/propylene oxide block copolymers, with a molecular weight $M_w$ of around 3400 g/mol and a weight ratio of ethylene oxide to (ethylene oxide+propylene oxide) of around 20%, sold under the name Pluronic L92, and respectively the product A1 of chemical formula $(R-O-(CH_2CH(CH_3)O)_a-(CH_2CH_2O)_b)_cP(=O)-OH_d$ where P is a phosphorus atom, c is between 1 and 2, c+d is equal to 3, a is equal to 0, b is equal to 4 and R represents a hydrocarbon-based chain having between 12 and 14 carbon atoms, the weight proportions of the product A1 of phosphate monoester and phosphate diester being respectively between 50 to 65% and 30 to 40%, and respectively rapeseed methyl ester.

For the fourth grade, the following additive was added to the bitumen, with a dose of 5 kg per metric ton of bitumen:

Additive 9 (type D): the blend, in 50/25/25 weight proportions respectively, of the polymer from the class of ethylene oxide/propylene oxide diblock copolymers, with a molecular weight $M_w$ of around 4100 g/mol and a weight ratio of ethylene oxide to (ethylene oxide+propylene oxide) of around 3%, and respectively the result of the condensation of aminoethylpiperazine and a vegetable oil having fatty chains that contain from 14 to 18 carbon atoms, having an iodine value above 90, obtained by pouring the vegetable oil over aminoethylpiperazine at 150° C. for 2 h, then by heating the whole mixture at 190° C. for 1 h, and respectively an alkylamidoimidazoline obtained by the condensation reaction between carboxylic acid, having a fatty chain that contains from 14 to 22 carbon atoms and an iodine value above 100, and a mixture of 50% diethylenetriamine with 30% triethylenetetramine and 20% aminoethylpiperazine.

Each additive was introduced via the hatch of the dedicated bitumen storage tank. The bitumen to which additive 8 had thus been added was used after 30 minutes of recirculation in the storage tank. The bitumen to which additive 9 had thus been added was used after 2 h 30 min of recirculation in the storage tank.

During the production of the bituminous mix, the following temperatures were respected:

the aggregate was heated to 160° C. in the case of the first grade and 120° C. in the case of the following three grades; and the bitumen was in all cases used at 160° C.

The spreading was carried out using a Marini MF905 finisher, the speed of advance of which was 5 m/min, and a Dynapac CC422 compacter, the speed of advance of which was 3 km/h, with a targeted covering thickness at the end of compacting of 5 cm. The number of passes made was 10, with a vibration amplitude of 0.8 mm and a frequency of 51 Hz. During compacting, the following temperatures of the BBSG were respected:

on pure bitumen, 135° C. on average for the first grade and 90° C. for the second grade;

on bitumen with additives, 95° C. for the third and fourth grades.

The following were measured on site: the apparent density using a gamma density probe according to the NF P 98-241-1 standard; the apparent density by hydrostatic weighing according to the NF P 98-250-6 standard; and the mean texture depth according to the NF EN 13036-1 standard. The porosities were calculated from the gamma densities corrected by the hydrostatic weighing measurements. The BBSG temperatures were measured in the core.

| Nature of the bitumen | $T_{aggregate}$ at production (° C.) | $T_{BBSG}$ at laying (° C.) | $T_{BBSG}$ at compacting (° C.) | Average texture depth (mm) | Average porosity (%) | Percentage of porosity measurements above the 8% threshold (%) |
|---|---|---|---|---|---|---|
| Pure bitumen | 160 | 160 | 135 | 0.7 | 3.4 | 0 |
| Pure bitumen | 120 | 120 | 90 | 0.8 | 7.9 | 40 |
| Bitumen + Additive 8 | 120 | 120 | 95 | 0.75 | 4.2 | 0 |
| Bitumen + Additive 9 | 120 | 120 | 95 | 0.8 | 5.1 | 0 |

The average texture depths were all acceptable. Compared with the porosity limits for the 0/10 Class 3 BBSGs, which are 4% and 8%, the reference BBSG is located below, proof that the compacting was too extreme. Under the same compacting conditions, the BBSG produced under degraded thermal production conditions without additive has an average porosity approaching the upper limit. The average porosity difference from the reference BBSG is greatly reduced when, despite the degraded thermal production conditions, additive 8 or 9 is added to the bitumen, with an advantage for additive 8. The last column in the table indicates that the grade produced under degraded thermal conditions without additive is outside the standard, since it is above the threshold of 10%. The grades produced under degraded thermal conditions with additive 8 or 9 are in accordance with the standard.

Example 4

The aggregates used in the cold-poured mix were microdiorites, the particle size distribution of which was as follows:

| | |
|---|---|
| 0/2 mm | 55% |
| 2/6 mm | 45%, | which falls within a Type III ISSA grading range and has a filler content of 10% by weight.

The added-water content was 10 g of water per 100 g of aggregates.

The CEMII 32.5R cement content was 1 g per 100 g of aggregates.

The bituminous emulsions according to the invention contained:

61% of Total Aqualt 70/100 penetration index bitumen;

10 kg of Polyram® S (acidified with hydrochloric acid so that the pH of the soap was 2) per 1000 kg of water+ additivated bitumen+Polyram® S emulsifier+acid. The bitumen content was 7 g per 100 g of aggregates. The additives added to the bitumen in an amount of 3 kg per metric ton of bitumen were the additive 1 from example 1 and the additives 5 and 6 from example 2.

By way of comparison, an emulsion was prepared which was distinguished from the previous one in that it did not contain any additive in the Total Aqualt 70/100 bitumen.

The aggregates wetted with the added water were mixed with one of the above emulsions using a spatula in a kettle until the emulsion broke, in order to determine the mechanical destabilization time of the mixture of aggregates, water and bitumen emulsion, a time that is judged by the increase in torque experienced during mixing. The aggregates wetted with the added water were mixed with one of the above emulsions using a spatula in a kettle for 40 s before the mixture was poured, in the seconds that followed, into a mold with a height of 10 mm placed on a sealing support. At the end of 3 min the mold was removed without deforming the bituminous mix and the cold-poured mix was left to set at 20° C.±2° C. for a certain time (30 minutes or 60 minutes or 90 minutes), then the maximum torque was measured according to the Bénédict test at a pressure of 2 bar.

| Bitumen formula | Destabilization time | Cohesion in kg · cm at 30 min | Cohesion in kg · cm at 60 min | Cohesion in kg · cm at 90 min |
|---|---|---|---|---|
| Pure bitumen | 90 s | 13 | 15 | 15 |
| Bitumen + Additive 1 | 95 s | 13 | 17 | 18 |
| Bitumen + Additive 5 | 85 s | 19 | 21 | 23 |
| Bitumen + Additive 6 | 90 s | 20 | 22 | 23 |

It is observed that introducing additives to the bitumen only very slightly modifies the destabilization time of the cold-poured bituminous mix. With no additive in the bitumen, the destabilization is not clean and the water that escapes from the bituminous mix is loaded with black particles. The cohesion does not attain the threshold of 20 kg·cm, even after setting for 90 minutes. For this precise aggregates/bitumen torque, the same applies with additive 1. Having additive 5 or 6 present in the bitumen makes it possible to increase the cohesion at a young age and makes the destabilization of the bituminous mix qualitatively good.

Example 5

A bitumen originating from a bituminous mix manufactured according to the invention was extracted according to the NF EN 12697-3 standard in order to analyze it. The 0/10 BBSG (semi-coarse bituminous concrete), from which the bitumen was extracted, was manufactured with the following granular formula:

| calcareous filler | 1.5% |
|---|---|
| 0/4 sand | 48.5% |
| 4/6 aggregates | 14% |
| 6/10 aggregates | 36% | with 5.6% of additivated bitumen. The bituminous mix was manufactured with a bitumen from TOTAL having a 35/50 penetration index to which 0.5% of additive 5 (type A, according to the description of example 2) was added. The bituminous mix was manufactured with the aggregate heated at 120° C. and the bitumen at 160° C.

To identify the chemical nature of the additive used, this was separated from the extracted bitumen according to the following process: 5 g of extracted bitumen were dissolved in 30 ml of heptane before adding 30 ml of methanol, while stirring, to form an emulsion. This emulsion was separated by centrifugation at 10 000 rpm for 10 minutes. The methanol phase was recovered and the methanol was evaporated under nitrogen at ambient temperature for 2 hours. Finally, the residue from this evaporation was dissolved in deuterated methanol for nuclear magnetic resonance (NMR) analysis in a Bruker AV 500 NMR spectrometer with a 5 mm TXI proton, carbon, phosphorus probe.

FIG. 1 shows the $^{13}$C NMR spectrum of additive 5 in solution in deuterated methanol, with the chemical shift on the x-axis. The characteristic signals of additive 5 may be recognized by comparison with a similar copolymer in the database of Sigma-Aldrich products, which highlight the nature of the blocks of this copolymer, with ethylene oxide blocks at the ends. The weight ratio of ethylene oxide to (ethylene oxide+propylene oxide) of 20.5% in additive 5 can also be identified with this analysis. An estimation of the molecular weight of $M_n$=4900 g/mol was also determined.

To identify the additive content in the extracted bitumen, after its chemical nature had been identified, a solution of 5% of this bitumen and 0.25% of pentachloroethane in deuterated chloroform was prepared. The pentachloroethane was used as an internal standard for calculating the content of additive. 0.5 ml of this solution was analyzed by $^1$H NMR.

Figure 2A:
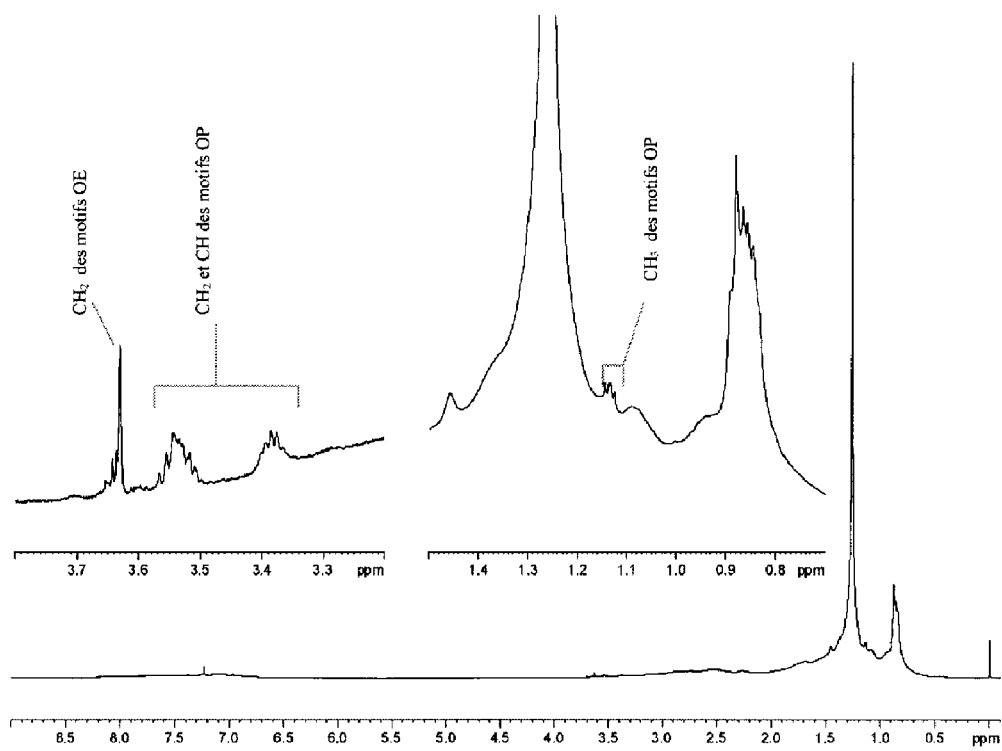
FIG. 2a is a $^1$H NMR spectrum of the extracted bitumen where the regions with signals relating to additive 5 are enlarged.

FIG. 2a shows the $^1$H NMR spectrum of the extracted bitumen where the regions with signals relating to additive 5 are enlarged. These signals are recognized by comparison with a similar copolymer in the database of Sigma-Aldrich products.

By using integration of the characteristic signals for ethylene oxide, propylene oxide and pentachloroethane, and the amount of this internal standard, the additive content can thus be calculated. The calculation for the content of additive 5 in the bitumen, $C_{add}/C_{bit}$ is the following:

$$C_{add}/C_{bit} = [Int_{EO} \times M_{n_{EO}} \times C_{PCE}] / [Int_{PCE} \times 4 \times f_{EO,add} \times M_{n_{PCE}} \times C_{bit}]$$

where $Int_{EO}$ and $Int_{PCE}$ are the integrations of the ethylene oxide groups (~3.7 ppm) and pentachloroethane (~6.1 ppm), $M_{n_{EO}}$ and $M_{n_{PCE}}$ are respectively the molecular weights of the ethylene oxide unit and pentachloro-ethane, $C_{PCE}$ and $C_{bit}$ are the concentrations of penta-chloroethane and bitumen in the deuterated chloroform solution and $f_{EO,add}$ is the fraction of ethylene oxide units in additive 5.

Figure 2B:
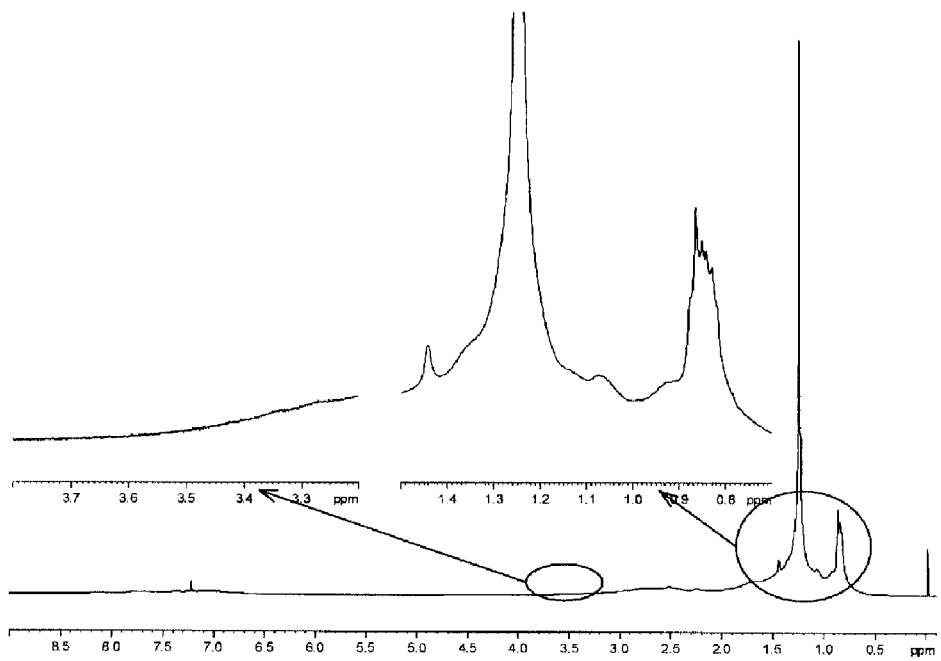
FIG. 2b is $^1$H NMR spectrum of the original 35/50 bitumen, without additives.

A content of 0.46% is thus calculated using this method. FIG. 2b represents the $^1$H NMR spectrum of the same original 35/50 bitumen, but without additives. The lack of signals in the region characteristic of additive 5 in the pure bitumen can be seen in this spectrum.

The invention claimed is:

1. Anhydrous bituminous products, characterized in that they contain at least one additive selected from the group consisting of:
   A: random or block ethylene oxide/propylene oxide copolymer(s) having a molecular weight between 500 µg/mol and 20 000 g/mol, with a weight ratio of ethylene oxide to (ethylene oxide+propylene oxide) between 1% and 70%, of which the overall dose per metric ton of bituminous product is between 0.1 and 5 kg;
   B: blend of at least one A and at least one product A1 of chemical formula: $(R-O-(CH_2CH(CH_3)O)_a-(CH_2CH_2O)_b)_cP(=O)-OH_d$ where P is a phosphorus atom, c is between 1 and 2, c+d is equal to 3, a is up to 10, b is up to 6 and R represents a hydrocarbon-based chain having 6 to 30 carbon atoms, the dose of product(s) A per metric ton of bituminous product being between 0.05 and 5 kg, the overall dose of additive A1 per metric ton of bituminous product preferably being between 0.05 and 10 kg and the respective proportions of the A to A1 being between 90/10 and 10/90;
   C: blend of at least one product A or at least one product A1 or at least one product B and at least one product A2, in a dose of product(s) A per metric ton of bituminous product between 0.05 and 9 kg, in a dose of product(s) A1 or B per metric ton of bituminous product between 0.05 and 10 kg, in a dose of product(s) A2 per metric ton of bituminous product between 0.05 and 10 kg, A2 selected from the group consisting of:
   A21 the product of the reaction of (di)alk(en)ylphenols with aldehydes, the aldehydes having from 1 to 10 carbon atoms, followed by a (poly)oxyethylation and/or (poly)oxypropylation, the alk(en)yl groups having between 1 and 50 carbon atoms and possibly being identical or different in the case of dialk(en)ylphenols, the part formed by (poly)oxyethylation and/or (poly)oxypropylation having a molecular weight greater than or equal to 45 g/mol and less than 20 000 g/mol, the number of phenol units varying between 3 and 50;
   A22 the (poly)oxyethylated and/or (poly)oxypropylated 2,2-bis(4-hydroxyphenyl)propane/epichlorohydrin copolymer, the part formed by (poly)oxyethylation and/or (poly)oxypropylation having a molecular weight greater than or equal to 45 g/mol and less than 20 000 g/mol;
   A23 the (poly)oxyethylated and/or (poly)oxypropylated bis(4-hydroxyphenyl)ethane/epichlorohydrin copolymer, the part formed by (poly)oxyethylation and/or (poly)oxypropylation having a molecular weight greater than or equal to 45 g/mol and less than 20 000 g/mol;
   A24 the (poly)oxyethylated and/or (poly)oxypropylated bis(4-hydroxyphenyl)methane/epichlorohydrin copolymer, the part formed by (poly)oxyethylation and/or (poly)oxypropylation having a molecular weight greater than or equal to 45 g/mol and less than 20 000 g/mol;
   A25 the product of the (poly)oxyethylation and/or (poly)oxypropylation of an alkyldicarboxylic acid or mixture of alkyldicarboxylic acids, the alkyl groups having between 1 and 20 carbon atoms, all of the parts formed by (poly)oxyethylation and/or (poly)oxypropylation having a molecular weight greater than 100 g/mol and less than 20 000 g/mol;
   A26 the product of the (poly)oxyethylation and/or (poly)oxypropylation of a fatty acid, the number of carbon atoms of which is between 10 and 30, the part formed by (poly)oxyethylation and/or (poly)oxypropylation having a molecular weight greater than 100 g/mol and less than 20 000 g/mol;
   A27 the product of the reaction between the product A21 and a mixture of A25 and A26;
   A28 the salt of alk(en)yl(aryl)sulfonic acid and alk(en)yl(aryl)amine, the alk(en)yl(aryl) units having a number of carbon atoms between 6 and 30; and/or
   A29 the salt of alk(en)yl(aryl)sulfonic acid and morpholine or pyrazine or pyrazoline or pyrazolone or pyridine or pyridone or pyrimidine or pyrrole or pyrrolidine or pyrrolidone or pyrroline or toluidine or imidazole or indole or indoline or oxindole, the alk(en)yl(aryl) units having a number of carbon atoms between 6 and 30; and
   D: blend of at least one product A or at least one product B or at least one product C and one or more adhesion dopes, the dose of product(s) B or C per metric ton of bituminous product being between 0.1 and 10 kg, the dose of product(s) A per metric ton of bituminous product being between 0.05 and 9 kg, the dose of adhesion dope(s) per metric ton of bituminous product being between 0.05 and 10 kg, the weight ratio of the product A, B or C to the adhesion dope(s) being between 90/10 and 10/90.

2. A process for preparing a bituminous product comprising bringing an additive as claimed in claim 1 into contact with a bituminous material at a temperature within the temperature range stretching from 100 to 250° C.

3. Bituminous mixes comprising the bituminous products as defined in claim 1, with aggregates.

4. A process for preparing bituminous mixes as claimed in claim 3, comprising mixing the bituminous product and aggregates to produce a bituminous mix at a temperature between 60 and 200° C.

5. The process for preparing the bituminous mixes as claimed in claim 3, characterized in that the mixing of the bituminous product and aggregates is carried out at a temperature of the bituminous product within the temperature range stretching from 100 to 250° C.

6. Aqueous emulsions of bituminous products containing at least one cationic emulsifier and at least one additive selected from the group consisting of:
   A: random or block ethylene oxide/propylene oxide copolymer(s) having a molecular weight between 500 g/mol and 20 000 g/mol, with a weight ratio of ethylene oxide to (ethylene oxide+propylene oxide) between 1% and 70%, at an overall dose per metric ton of bituminous product is between 0.1 and 5 kg; and
   D1: blend of at least one A and one or more adhesion dopes, the dose of A per metric ton of bituminous product being between 0.1 and 9 kg, the dose of adhesion dope(s) per metric ton of bituminous product being between 0.05 and 10 kg, the weight ratio of A to the adhesion dope(s) being between 95/5 and 10/90.

7. The aqueous emulsions of claim 6 further comprising aggregates.

8. The bituminous products of claim 1 characterized in that the weight ratio of ethylene oxide to (ethylene oxide+propylene oxide) for the random copolymer is between 0.01 and 0.7, and the sum molecular weight is between 500 and 20,000.

9. The bituminous products of claim 1 characterized in that the weight ratio of ethylene oxide to (ethylene oxide+propylene oxide) for the block copolymer is between 0.01 and 0.7, the molecular weight is between 500 and 20,000.

10. The bituminous products of claim 1 characterized in that the dose of product(s) A in B is between 0.05 and 5 kg per metric ton of bituminous product.

11. The bituminous products of claim 1 characterized in that A21 is the product of the reaction of (di)alk(en)ylphenols with aldehydes, having from 1 to 5 carbon atoms.

12. The bituminous products of claim 1 characterized in that the alk(en)yl groups of A21 comprise between 2 and 20 carbon atoms.

13. The bituminous products of claim 1 characterized in that the alkyl groups having of A25 comprise between 1 and 10 carbon atoms.

14. The bituminous products of claim 1 characterized in that the fatty acid of A26 comprise tall oil fatty acid.

15. The bituminous products of claim 1 characterized in that the alk(en)yl(aryl) groups of A28 comprise the salt of dodecylbenzenesulfonic acid and tallow amine.

16. The bituminous products of claim 1 characterized in that the alk(en)yl(aryl) groups of A28 comprise the salt of dodecylbenzenesulfonic acid and cyclohexylamine.

17. The bituminous products of claim 1 characterized in that the salt of A29 comprise the salt of dodecylbenzenesulfonic acid and morpholine.

18. The aqueous emulsions of claim 6 characterized in that the chemical formula for the random copolymer is HO—$(CH_2CH_2O)_a$—$(CH_2CH(CH_3)O)_b$—H, the weight ratio of ethylene oxide to (ethylene oxide+propylene oxide) is between 0.01 and 0.7, and the sum molecular weight is between 500 and 20,000.

19. The aqueous emulsions of claim 6 characterized in that the chemical formula for the block copolymer is HO—$(CH_2CH_2O)_c$—$(CH_2CH(CH_3)O)_d$—$(CH_2CH_2O)_e$—H or HO—$(CH_2CH_2O)_{c+e}$—$(CH_2CH(CH_3)O)_d$—H, the weight ratio of ethylene oxide to (ethylene oxide+propylene oxide) is between 0.01 and 0.7, the molecular weight is between 500 and 20,000.

20. The aqueous emulsions of claim 6 characterized in that the dose of additive per metric ton of bituminous product is between 0.05 and 5 kg.

21. The aqueous emulsions of claim 6 characterized in that the weight ratio of A to the adhesion dope(s) being between 95/5 and 50/50.

* * * * *